United States Patent Office 3,743,518
Patented July 3, 1973

3,743,518
ARTIFICIAL SWEETENER COMPOSITION
Marvin E. Eisenstadt, Belle Harbor, N.Y., assignor to
Cumberland Packing Corp., Brooklyn, N.Y.
No Drawing. Filed Jan. 18, 1971, Ser. No. 107,516
Int. Cl. A23l 1/26
U.S. Cl. 99—141 A
4 Claims

ABSTRACT OF THE DISCLOSURE

The invention relates to new artificial sweetener compositions, and more particularly artificial sweetener compositions which have no bitter aftertaste, can be used freely by diabetics and are non dairy. The artificial sweetener compositions of the present invention utilize saccharine as the artificial sweetener and contain as additives thereto gluconic acid or a salt thereof and fructose. The gluconic acid and fructose act to eliminate the bitter aftertaste of saccharine and the fructose, although it supplies calories can be used by diabetics because it is readily metabolized and forms glycogen even when insulin is absent.

BACKGROUND OF THE INVENTION

Artificial sweeteners have been commonly used for many years in place of sugar for reduction of caloric intake and for medical reasons, particularly for diabetics in order to limit the amount of sugar in their diet.

The only artificial sweetener, or group of artificial sweeteners, presently in use, as a result of regulations of the Food and Drug Administration are the saccharines. The saccharines are extremely sweet, having about three hundred times the sweetening power of sugar. However, these saccharines have an extremely strong bitter aftertaste and it has been quite common to utilize compositions in which the saccharines are admixed with other substances for the purpose of minimizing the bitter aftertaste of the saccharines.

Thus, lactose has been used for this purpose, either together with cyclamates (recently banned by the Food and Drug Administration) or with other additives.

Although lactose is quite effective for this purpose, particularly together with other additives, it suffers from two disadvantages which limit its use. Thus, lactose supplies carbohydrates, and even though the amount is rather small, generally about 1 gram of lactose is used along with the saccharine to obtain the sweetening effect of two teaspoons of sugar, nevertheless this small amount of lactose must be taken into consideration by diabetics. Thus, if a diabetic uses a large amount of artificial sweeteners, then the carbohydrate intake as a result of the lactose could be significant.

Furthermore, lactose, which is also known as milk sugar, cannot be used by persons of orthodox Jewish religion along with or shortly after meals including meat because the lactose is considered to be a dairy product and dairy cannot be mixed with meat.

Attempts to avoid the problem with respect to diabetics by the use of gluconates have not been entirely satisfactory in achieving a composition which has a sweetness taste akin to that of natural sugar while still avoiding bitter aftertaste.

SUMMARY OF THE INVENTION

Generally speaking, in accordance with the present invention, a composition is provided of saccharine, a gluconate (e.g. glucono delta lactone, gluconic acid or a salt thereof such as sodium gluconate, potassium gluconate or calcium gluconate) and fructose. By using fructose together with the gluconate it is possible to provide a composition which avoids the bitter aftertaste of saccharine, using saccharine alone as the artificial sweetener while providing a product that can be used by diabetics, is strictly non dairy and which has an extremely natural sweetening effect.

It is accordingly a primary object of the present invention to provide a sweetening composition which while using a saccharine as the artificial sweetener does not have the bitter aftertaste of the saccharine and which can be used together with all types of food without any undesired effect on the normal taste of the food.

It is yet a further object of the present invention to provide compositions of saccharine, a gluconate and fructose, which have no undesired bitter aftertaste, which can be used freely by diabetics and by persons of orthdodox Jewish religion, which provide a minimum number of calories, and which provide a sweetening effect very close to that of natural sugar.

Other objects and advantages of the present invention will be apparent from a further reading of the specification and of the appended claims.

With the above and other objects in view, the present invention mainly comprises an artificial sweetening composition consisting essentially of a saccharine artificial sweetener, a gluconate and fructose. The amount of fructose should be between about 3 and 7 times (by weight) the amount of the saccharine artificial sweetener, most preferably about 5 times the amount of the saccharine artificial sweetener, and the amount of the gluconate should be between about 10 and 15 times the amount of the saccharine artificial sweetener, preferably about 12 times the amount of the saccharine artificial sweetener.

The term "saccharine artificial sweetener" as used throughout the specification and claims of this case is meant to refer to saccharine itself and the salts thereof such as sodium saccharine, potassium saccharine, etc.

The term "gluconate" as used throughout the specification and claims of this case is meant to refer to glucono delta lactone, gluconic acid, and salts of gluconic acid such as sodium gluconate, potassium gluconate and calcium gluconate.

Fructose, which is also known a levulose and fruit sugar can of course be used in any of its forms.

By using the saccharine together with the gluconate and fructose in the ratios indicated it is possible to obtain a complete masking of the bitter aftertaste of the saccharine without adversely affecting the taste of any food or beverage to which the composition of the invention is applied.

DESCRIPTION OF PREFERRED EMBODIMENTS

The following examples are given to further illustrate the present invention. The scope of the invention is not, however, meant to be limited to the specific details of the examples.

Example 1

5.5 lbs. of calcium saccharine, 27.8 lbs. of fructose and 66.7 lbs. of sodium gluconate are thoroughly mixed to provide a uniform mixture.

The resulting mixture is many times as sweet as natural sugar and in fact 1 gram thereof is equivalent in sweetness to two teaspoons of natural sugar. 1 gram of the composition provides a single calorie, and although the fructose is a carbohydrate, the composition can nevertheless be used by diabetics because the fructose is converted into glycogen even without insulin. This composition can be used to sweeten beverages or in cooking, in all quantities, even to highly sweeten beverages, without causing any bitter aftertaste and without adversely affecting the taste of the food or beverage to which it is applied.

Example 2

A sweetening composition is prepared as in Example 1, however using 5 lbs. of sodium saccharine, 18 lbs. of fructose and 74 lbs. of calcium gluconate.

Each gram of the above product gives approximately the sweetening power of two teaspoons of sugar.

Example 3

A sweetening composition is prepared as in Example 2, however using 34 lbs. of glucono delta lactone and 40 lbs. of sodium gluconate in place of the calcium gluconate.

Example 4

A sweetening composition is prepared as in Example 1, however using 6 lbs. of saccharine, 30 lbs. of fructose and 64 lbs. of sodium gluconate.

A cup of coffee sweetened with 1 gram of the composition of any of the examples tastes as though it had been sweetened with two teaspoons (approximately 10 grams) of ordinary sugar.

The above compositions may be used in baking, in preparing cooked fruits, in cooking, in the making of candies, etc.

While the invention has been described in particular with respect to specific combinations of saccharine, gluconate and fructose, it is apparent that variations and modifications can be made.

What is claimed is:

1. A sweetening composition consisting essentially of a saccharine artificial sweetener, fructose in an amount of about 3–7 times the amount of said saccharine artificial sweetener, and a gluconate in an amount of about 10–15 times the amount of said saccharine artificial sweetener.

2. Composition according to claim 1 wherein said gluconate is sodium gluconate.

3. Compositions according to claim 1 wherein said fructose is present in an amount of about 5 times the amount of said saccharine artificial sweetener and said gluconate is present in an amount of about 12 times the amount of said saccharine artificial sweetener.

4. Composition according to claim 3 wherein said gluconate is sodium gluconate.

References Cited

UNITED STATES PATENTS

| 2,761,783 | 9/1956 | Ferguson | 99—141 |
| 3,489,572 | 1/1970 | Kracauer | 99—141 |
| 3,647,483 | 3/1972 | Eisenstadt | 99—141 |

FOREIGN PATENTS

| 977,482 | 1964 | Great Britain. |
| 602,572 | 1960 | Canada. |

RAYMOND N. JONES, Primary Examiner